United States Patent [19]

Ootaki

[11] Patent Number: 5,459,593
[45] Date of Patent: Oct. 17, 1995

[54] REFLECTION TYPE LIQUID CRYSTAL DISPLAY APPARATUS WHICH PREVENTS ROTATION OF THE POLARIZATION PLANE

[75] Inventor: Sakashi Ootaki, Tsuragashima, Japan

[73] Assignee: Pioneer Electronic Corporation, Tokyo, Japan

[21] Appl. No.: 160,254

[22] Filed: Dec. 2, 1993

[30] Foreign Application Priority Data

Dec. 2, 1992 [JP] Japan ................... 4-323360

[51] Int. Cl.[6] .................. G02F 1/1335; G03B 21/00
[52] U.S. Cl. .................. 359/40; 359/65; 359/33
[58] Field of Search .................. 359/495, 496, 359/489, 634, 40, 41, 49, 65; 353/20, 31, 33, 34, 37

[56] References Cited

U.S. PATENT DOCUMENTS

| 4,127,822 | 11/1978 | Jacobson et al. | 353/37 |
| 4,827,334 | 5/1989 | Johnson et al. | 359/495 |
| 5,327,270 | 7/1994 | Miyatake | 359/499 |

FOREIGN PATENT DOCUMENTS 2-22627  1/1990  Japan.
2-69721  3/1990  Japan.
4-163427 6/1992 Japan.

*Primary Examiner*—Anita Pellman Gross
*Assistant Examiner*—James Dudek
*Attorney, Agent, or Firm*—Fish & Richardson

[57] ABSTRACT

A reflecting type liquid crystal display apparatus which can prevent an unnecessary rotation of the plane of polarization in a polarizing prism. The apparatus has: a reflecting type liquid crystal device for changing a polarizing state in accordance with an image, thereby reflecting an incident light; and a polarizing prism 50 for emitting the light of a predetermined polarized component in the incident light from a light source at a surface of polarization operation, for inputting the emitted light into the reflecting type liquid crystal device, for emitting the light of a predetermined polarized component in the incident light from the reflecting type liquid crystal device, thereby obtaining a projection image. A plate for compensating the polarizing state having a surface in an oblique direction different from an oblique direction of the surface of polarization operation and also having a predetermined phase difference is arranged in an optical path between the reflecting type liquid crystal device and the polarizing prism.

7 Claims, 17 Drawing Sheets

FIG. 5B
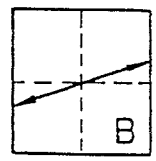
FIG. 5E  FIG. 5A  FIG. 5C
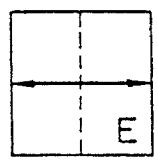 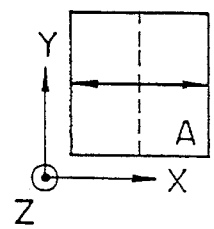 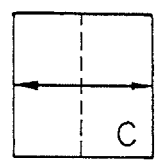
FIG. 5D
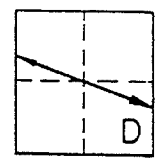
FIG. 6B
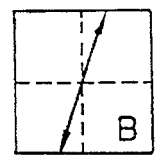
FIG. 6E  FIG. 6A  FIG. 6C
 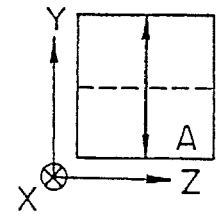 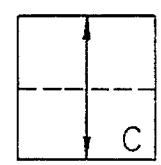
FIG. 6D
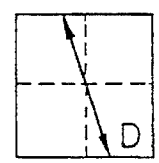

2% OR LESS

REFLECTION TYPE LIQUID CRYSTAL DISPLAY APPARATUS WHICH PREVENTS ROTATION OF THE POLARIZATION PLANE

BACKGROUND OF THE INVENTION

1. Field of the Invention

The invention relates to a reflection type liquid crystal display apparatus, which apparatus having: a liquid crystal device of a reflection type for reflecting incident light by changing the state of polarization in accordance with an image; and a polarizing prism for emitting the light of a predetermined polarized component in the light irradiated from a light source and inputting the light into the reflecting type liquid crystal device and for emitting the light of the predetermined polarized component in the reflected light from the reflecting type liquid crystal device, thereby obtaining a projection image.

2. Description of Background Information

FIG. 1 shows an image display apparatus which uses a liquid crystal light valve of the photoconductive type (hereinafter, simply referred to as a light valve) disclosed in Japanese Patent Application Kokai Nos. H2-22627, H2-69721, H4-163427, filed by the same applicant as the present invention, as a reflecting type liquid crystal panel. The apparatus receives a read-out light from a light source and changes the state of polarization of the read-out light in accordance with the image formed on a photoconductive layer, thereby obtaining a projection image.

As shown in the figure, such a display apparatus is configured that a CRT (cathode ray tube) 1R for a red color to generate a red image and a photoconductive type liquid crystal light valve (hereinafter, simply referred to as a light valve) 2R for the red color which uses the red image as writing light are coupled to sandwich an optical fiber 3R, thereby forming a first color channel. In the similar manner, a second color channel is formed by a CRT 1G for a green color, a light valve 2G for the green color, and an optical fiber 3G. A third color channel is formed by a CRT 1B for a blue color, a light valve 2B for the blue color, and an optical fiber 3B.

On the other hand, the incident light to each of the light valves in the first to third color channels described above is irradiated from a light source 4. The incident light is first led to a polarizing prism 5. Only the s-polarized (Senkrecht polarized light) component in the incident light is bent by the polarizing prism 5 in the direction perpendicular to the progressing direction and leads to a dichroic mirror 9.

The dichroic mirror 9 has special characteristics such that the green light is reflected and the red and blue light is transmitted. The red and blue light which is transmitted through the dichroic mirror 9 reaches a dichroic mirror 10. The reflected green light is further reflected by a total reflecting mirror 11 and is led to the light valve 2G for the green color. The dichroic mirror 10 has spectral characteristics such that the blue light is reflected and the red light is transmitted. The dichroic mirror 10 leads the light of those primary colors to the light valve 2B for the blue color and to the light valve 2R for the red color, respectively.

Each light valve reflects the read-out light incident as an s-polarized light, including a p-polarized (polarized light) component according to a CRT output image, thereby executing a light modulation. The reflected read-out light, namely, the output projection light of each color channel again enters the polarizing prism 5 through the dichroic mirrors 9 and 10 and is synthesized to one image. The polarizing prism 5 transmits only the p-polarized light according to the image in the synthesized projection light and projects the image onto a screen through a projection lens (not shown).

In the display apparatus, for example, a metal halide lamp is used as a light source 4. This lamp has an arc length of about 5 mm. The outgoing light obtained by reflecting the emitted light by a parabolic mirror will become slightly inclined with respect to an optical axis LO as shown in FIG. 2 and the inclined light will enter the polarizing prism 5.

FIG. 3 shows polarizing characteristics of the prism 5. In the diagram, an axis of abscissa λ [nanometers] denotes a wavelength of the light which enters the prism 5. An axis of ordinate T [%] indicates a transmittance of the incident light. In the diagram, $T_p$ denotes transmittance characteristics of the p-polarized component in the incident light and $T_s$ indicates transmittance characteristics of the s-polarized component in the incident light. From this characteristics diagram, it will be also understood that the polarizing prism 5 has the polarizing characteristics such that the p-polarized component is transmitted and the s-polarized component is reflected.

There is a phenomenon such that, when a slightly inclined light beam enters such a polarizing prism from the metal halide lamp as mentioned above, the plane of polarization of the light beam other than the light beam of a special azimuth (direction that is parallel to the plane of incidence of the incident light beam that is parallel to the optical axis) rotates as will be explained hereinbelow. There is, consequently, a problem such that the contrast of the image is deteriorated.

More specifically, as shown in FIG. 4, if we assume that the light source 4 is a so called point light source P, a light beam PQ that is parallel to the optical axis LO enters the polarizing prism 5. At a boundary surface (hereinafter, referred to as surface of polarization operation) 5a of the polarizing prism 5, the prism 5 transmits the p-polarized light in the incident light beam PQ to obtain the light beam $L_p$ and reflects the s-polarized light to obtain the light beam $L_s$.

The polarizing state of the transmitted light beam $L_p$ at the surface of polarization operation 5a in this instance is diagrammatically shown in the part A in FIG. 5. A polarizing state of the reflected light beam $L_s$ is diagrammatically shown in the part A in FIG. 6. In FIGS. 4 to 6, each polarizing state is shown by using common coordinate axes X, Y, and Z. The plane including the coordinate axes X and Z is parallel to a so called plane of incidence including a normal line QR at an incident point Q on the surface of polarization operation 5a, the incident light beam PQ, and the reflected light beam $L_8$. The plane including the coordinate axes Y and Z crosses the plane of incidence at right angles and is parallel to the optical axis LO. As shown in the part A in FIG. 5, the transmitted light beam $L_p$ is a linear polarization light whose direction of polarization is included in the plane of incidence and is perpendicular to the optical axis LO, so that it will be understood that the plane of polarization of the transmitted light beam $L_p$ is in the direction that is parallel to the coordinate axis X. As shown in the part A in FIG. 6, since the reflected light beam $L_s$ is a linear polarization light whose direction of polarization is perpendicular to the plane of incidence and is perpendicular to the optical axis LO, it will be understood that the plane of polarization of the reflected light beam $L_s$ is in the direction that is parallel to the coordinate axis Y.

On the other hand, the prism 5 also receives light beams shown by arrows B, C, D, and E in FIG. 4 each is inclined with respect to the optical axis LO. At the surface of polarization operation 5a, the prism 5 transmits the p-polarized light in the incident light beams B, C, D, and E and reflects the s-polarized light in a manner similar to the incident light beam PQ that is to the optical axis LO. The state of polarization of the transmitted light beam at the surface of polarization operation 5a when the light beam B is incident is schematically shown in the part B in FIG. 5 and the state of polarization of the reflected light beam is shown in the part B in FIG. 6. The state of polarization of the transmitted light beam at the surface of polarization operation 5a when the light beam C is incident is schematically shown in the part C in FIG. 5 and the state of polarization of the reflected light is shown in the part C in FIG. 6. The state of polarization of the transmitted light beam at the surface of polarization operation 5a when the light beam D is incident is schematically shown in the part D in FIG. 5 and the state of polarization of the reflected light is shown in the part D in FIG. 6. The state of polarization of the transmitted light beam at the surface of polarization operation 5a when the light beam E is incident is schematically shown in the part E in FIG. 5 and the state of polarization of the reflected light beam is shown in the part E in FIG. 6.

As shown in the parts E and C in FIG. 5, the transmitted light beam is the linear polarization light included in the plane of incidence and each incident light beam is not parallel to the optical axis LO. The plane of incidence, however, which is formed to include the normal line standing at the incident point on the surface of polarization operation 5a and the incident light beam E or C, is parallel to the plane of incidence of the incident light beam PQ that is parallel to the optical axis LO as mentioned above. It will, accordingly, be understood that the plane of polarization of the transmitted light beam is also in the direction that is parallel to the coordinate axis X in a manner similar to that shown in the part A in FIG. 5. As shown in the parts E and C in FIG. 6, since the reflected light beam is a linear polarization light perpendicular to such a plane of incidence, it will be also understood that the plane of polarization of the reflected light is also in the direction that is parallel to the coordinate axis Y in a manner similar to that shown in the part A in FIG. 6.

As shown in parts B and D in FIG. 5, on the other hand, the transmitted light beam is a linear polarization light included in a plane of incidence and each incident light beam is inclined with respect to the optical axis LO in the direction of Y-axis (also including the negative direction: the same shall also be applied to the description given hereinbelow). The plane of incidence which is formed to include the normal line at the incident point on the surface of polarization operation 5a and the incident light beam B or D is inclined with respect to the plane of incidence which is formed by the incident light beam PQ that is parallel to the optical axis LO mentioned above in the direction of X-axis. It will, accordingly, be understood that the plane of polarization of the transmitted light beam is also in the direction that is inclined with respect to the coordinate axis X in accordance with such an inclination. As shown in the parts B and D in FIG. 6, since the reflected light beam is a linear polarization light perpendicular to the plane of incidence having an angle for the coordinate axis X, it will be also understood that the plane of polarization of the reflected light is in the direction that is inclined for the coordinate axis Y in accordance with such an angle.

As mentioned above, the plane of polarization is rotated in each of the light beams other than the light beams (light beams C, E, and the like) which are incident in parallel to the plane of incidence of the incident light beam PQ that is parallel to the optical axis LO. In spite of the fact that the plane of polarization should inherently be rotated in accordance with only the image formed on the light valve, therefore, the plane of polarization is unnecessarily rotated by the polarizing prism 5 which is not directly related to the formation of the image and such a rotation will cause the deterioration of the contrast of displayed images.

OBJECTS AND SUMMARY OF THE INVENTION

The invention is made in consideration of the problem mentioned above and an object of the invention is to provide an image display apparatus in which the contrast of the image is improved by providing a measure to cope with the unnecessary rotation of the plane of polarization in a polarizing prism.

According to the invention, there is provided a liquid crystal display apparatus of the reflecting type comprising: a reflecting type liquid crystal device for reflecting an incident light by changing a polarizing state in accordance with an image; and polarizing prism for emitting the light of a predetermined polarized component in the incident light from a light source at a surface of polarization operation and inputting the light into the reflecting type liquid crystal device and emitting the light of a predetermined polarized component in the incident light from the reflecting type liquid crystal device, thereby obtaining a projection image, wherein the apparatus is characterized in that a polarizing state compensating plate having a predetermined phase difference is arranged in an optical path between the reflecting type liquid crystal device and the polarizing prism.

According to the reflecting type liquid crystal display apparatus of the invention, the polarizing state compensating plate arranged in the optical path between the reflecting type liquid crystal device and the polarizing prism is operative to compensate the rotation of the plane of polarization of the incident light inclined with respect to the optical axis.

BRIEF DESCRIPTION OF THE DRAWINGS

FIG. 5 is a diagram showing a polarizing state of the light which is transmitted through the polarizing prism in the image display apparatus in FIG. 1;

FIG. 6 is a diagram showing a polarizing state of the light which is reflected by the polarizing prism in the image display apparatus in FIG. 1;

DETAILED DESCRIPTION OF THE EMBODIMENTS

An embodiment of the invention will be described in detail hereinafter with reference to the accompanying drawings.

Figure 7:
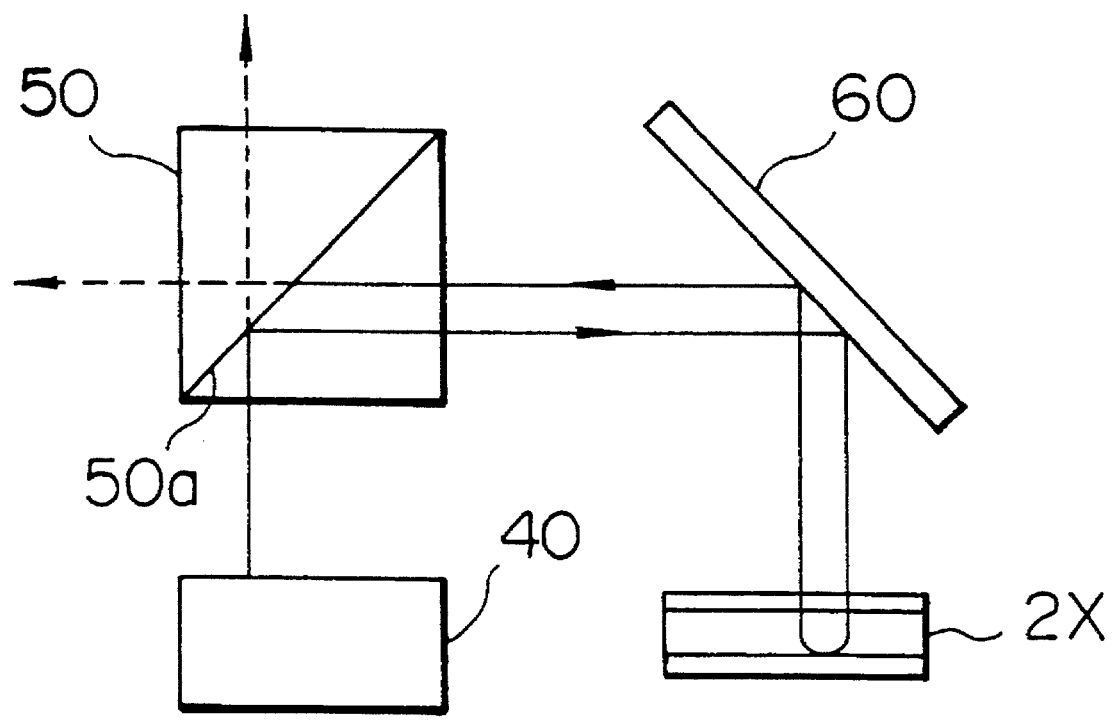
FIG. 7 is a diagram showing a construction of a main section of an image display apparatus according to an embodiment of the invention.

FIG. 7 is a diagram showing the construction of a main section of an image display apparatus of an embodiment according to the invention.

In the diagram, a light irradiated from a light source 40 enters a polarizing prism 50. At a surface of polarization operation 50a of the polarizing prism 50, the p-polarized light in the incident light is transmitted and the s-polarized light is reflected. The reflected s-polarized light is led to a compensating plate 60 for compensating the polarization plane which is formed by laminating a plurality of dielectric thin films on the surface of a transparent substrate.

As an example, a green reflection mirror to be used as the compensating plate 60 is made in the manner described as follows. Because it is sufficient to cover the wavelength range of green color, the wavelength of light incident at an angle of 45' to be considered in designing the mirror is limited to a range of 510–590 nanometers. As the transparent substrate of the mirror, the most popularly used glass material BK7 whose refractive index n is equal to 1.52 is employed. The specifications targeted are: reflectivity equal to or above 99% for the wavelength range described above (for both p- and s-polarized light), and phase difference of reflection within the range of 30–75 degrees.

The optical multilayer thin films are designed in the following manner. $TiO_2$ (having a refractive index of 2.3 and abbreviated as H hereinafter) is used as a material of high refractive index, and $SiO_2$ (having a refractive index of 1.45 and abbreviated as L hereinafter) is used as a material of low refractive index. To form the multilayer films, H and L are evaporated alternately, twenty three times, so that the substrate is coated with twenty three thin films. The thus produced structure can be illustrated as: substrate/ HLHLHLHLHLHLHLHLHLHLHLH/air. The thickness of each layer is:

substrate/65,103,65,103,65,103,65,103,65,103, 65,103,65,103,65,103,65,103,65,103, 46,62,39/air where the thickness are expressed in nanometers.

The reflection mirror (to be used as the compensating plate 60) is produced by the above described process, and the above-mentioned conditions of reflectivity and phase difference are satisfied.

The compensating plate for compensation 60 (hereinafter, referred to as compensating plate, or polarization plane compensating plate) can selectively cause a predetermined phase difference for a certain angle of incidence of the incident light, as will be explained in detail hereinafter. The s-polarized light from the polarizing prism 50 which is reflected by the compensating plate 60 enters a reflecting type liquid crystal panel 2X. The panel 2X reflects the incident light in accordance with the image formed in the liquid crystal layer. In this example, the panel 2X reflects the incident light so as to include the p-polarized light according to such an image. The light reflected by the liquid crystal panel 2X is led to the polarizing prism 50 by the compensating plate 60. At the surface of polarization operation 50a of the prism 50, the p-polarized light in the incident light is transmitted and the s-polarized light is reflected in a manner similar to the above. Only the p-polarized light from the liquid crystal panel 2X to form the image, therefore, is projected onto the screen through a projection lens (not shown).

The embodiment features the use of the polarization plane compensating plate 60 arranged between the polarizing prism 50 and the liquid crystal pane 2X. By such a substrate 60, the rotation of the plane of polarization in the incident light having an angle for the optical axis from the light source 40 as mentioned above is compensated as will be explained in detail hereinbelow.

Figure 8:
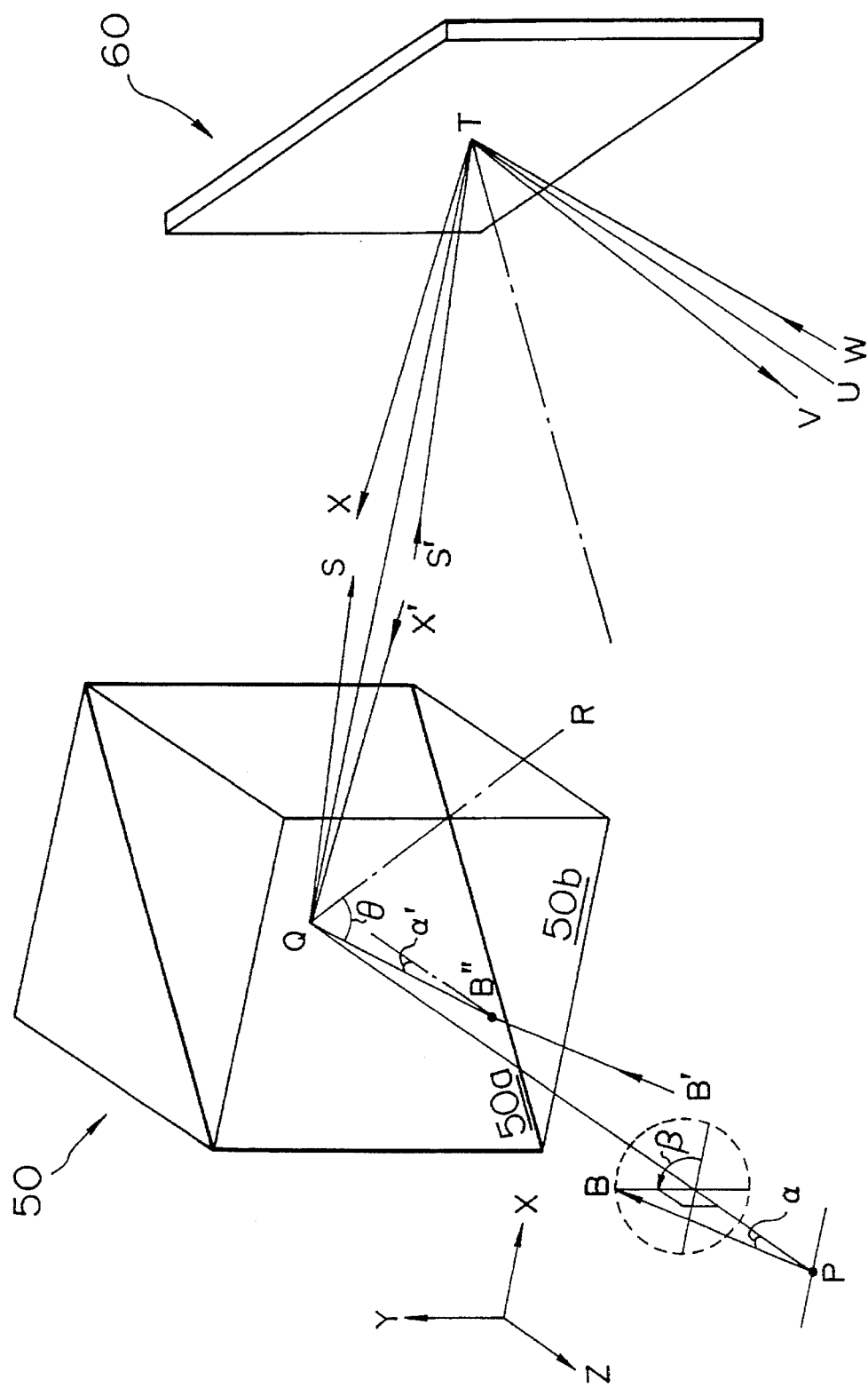
FIG. 8 is a diagram for explaining the operation of a polarizing prism in the image display apparatus in FIG. 7.

It is now assumed as shown in FIG. 8 that an angle (referred to as an angle in the radial direction) between the incident light beam PB from the point light source P and the incident light beam PQ that is parallel to the optical axis LO is α and an angle (referred to as an angle in the circumferential direction) between the perpendicular line to the incident light beam PQ which is drawn from one arbitrary point on the incident light beam and the plane of incidence which is formed by the incident light beam PQ is β. In this case, the incident light beam is expressed by the following equation, after the refraction at an outer boundary surface 50b of the polarizing prism 50.

$$n \sin\alpha' = \sin\alpha$$

$$\therefore \sin\alpha' = (\sin\alpha)/n \quad (1)$$

The light beam PB and a light beam B"B" are parallel to each other. The sign α' denotes an angle between a normal line at an incident point B" at the boundary surface 5b of the incident light beam and its refractive light beam as shown in the diagram. The letter n denotes a refractive index of the medium which forms the boundary surface 50b.

The angle of incidence θ to the surface of polarization operation 50a of such an incident light beam is expressed by the following equation.

$$\cos\theta = (\cos\alpha')/2^{1/2} \quad (2)$$

Figure 9E:
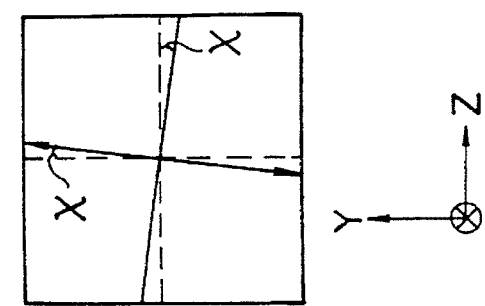
FIGS. 9A, 9B, 9C, 9D, and 9E are diagrams each showing a polarizing state and a plane of incidence on each optical path between the optical elements in the case where a phase difference by a compensating plate in the image display apparatus in FIG. 7 doesn't exist.
Figure 9D:
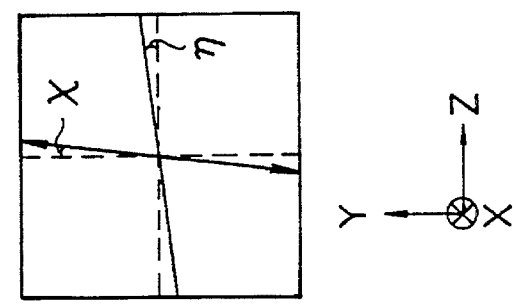
Figure 9C:
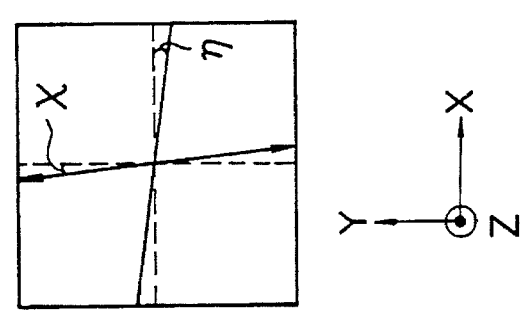
Figure 9B:
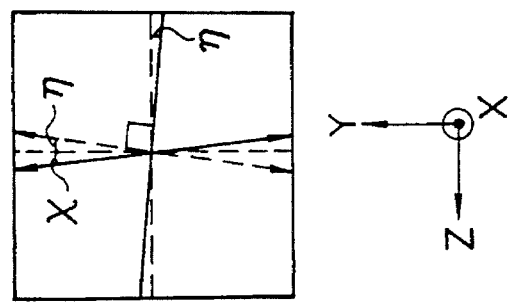
Figure 9A:
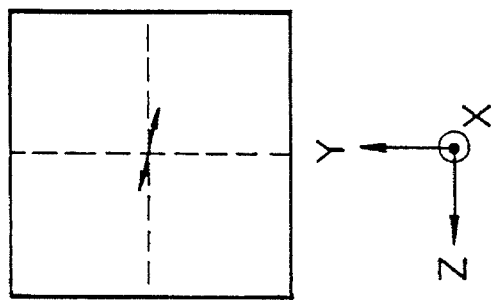

It is now assumed that the plane of incidence which is formed by a light beam B"Q that enters the surface of polarization operation 50a in this instance is inclined by only an angle X for the X-Z plane (plane which crosses perpendicularly an axis of rotation (Y axis) of the surface of polarization operation 50a) as shown in FIG. 9A, the following equation is derived.

$$\cos x = (\sin\alpha')/(n^2 + \sin^2\alpha')^{1/2}$$

$$= (\sin\alpha)/(1+\sin^2\alpha)^{1/2} \quad (3)$$

For example, assuming that n=1.52 and α=8°, therefore, the following equation is obtained.

$$x = 5.232° \quad (4)$$

In case of the polarizing prism, as shown in FIG. 9A, the angle x is directly set to a rotational angle of the plane of polarization of the reflected light QS. A reflected light QS is a light beam which is inclined upward in the Y-axis direction with respect to the optical axis QT.

Now, assuming that a reflected light beam S'T (the light beam QS is parallel to the light beam S'T) enters the compensating plate 60, its polarizing state and the plane of incidence are as shown in FIG. 9B. That is, with respect to the light incident into the compensating plate 60, since the medium before the light incidence is the air, n=1 and it is sufficient to substitute it into the above equations while setting α'=α. When it is assumed that an angle between the plane of incidence and an X—Z plane is η as shown in FIG. 9B, when α=8°, $$\eta = 7.923° \quad (5)$$

The light beam S'T is further reflected by the compensating plate 60 and enters the reflecting type liquid crystal panel 2X as a light beam TV which is upward in the Y-axis direction for an optical axis TU. The light beam TV is reflected by the reflecting type liquid crystal panel 2X, for instance, in a dark state and becomes a light beam WT that is inclined upward in the Y-axis direction with respect to the optical axis UT and again enters the compensating plate 60. Its polarizing state and the plane of incidence are as shown in FIG. 9C.

The light beam WT from the liquid crystal panel 2X is reflected by the compensating plate 60 and becomes a light beam TX (light beams X'Q; the light beam TX is to the light beam X'Q) that is inclined upward in the Y-axis direction with respect to the optical axis TQ and again enters the polarizing prism 50. Its polarizing state and the plane of incidence in this instance are as shown in FIG. 9D.

The polarizing prism 50, accordingly, reflects the s-polarized component which vibrates in the direction perpendicular to the plane of incidence in the incident light beam and transmits only the p-polarized component as shown in FIG. 9E which vibrates in the direction that is parallel to the plane of incidence.

The liquid crystal panel 2X is in the dark state and its contrast is deteriorated by an amount of the transmission of the p-polarized component as shown in FIG. 9E. Preferably, the p-polarized component which is transmitted through the polarizing prism 50 and is projected onto the screen should be shut off. To shut off the p-polarized component as shown in FIG. 9E, therefore, the plane of polarization of the incident light beam which enters the polarizing prism 50 as shown by an arrow of a solid line in FIG. 9D must be rotated so as to coincide with the plane perpendicular to the plane of incidence as shown by an arrow of a broken line.

In the embodiment, by giving a predetermined phase difference to the incident light in the compensating plate 60, the plane of polarization as shown by the solid line arrow in FIG. 9D is rotated in the direction perpendicular to the plane of incidence as shown by the broken line arrow.

That is, when it is assumed that a polarizing state of the light entering the compensating plate 60 is as shown by the following equation (6)

$$\begin{bmatrix} E_x \\ E_y \end{bmatrix} = \begin{bmatrix} \sin\chi \\ \cos\chi \end{bmatrix} \quad \text{equation (6)}$$

and when a phase difference of the compensating plate 60 is δ, a polarizing state of the light beam which is transmitted through or reflected by the compensating plate 60 is as shown by the following equation (7).

$$\begin{bmatrix} E_x \\ E_y \end{bmatrix} = \begin{bmatrix} \cos(-\eta) & -\sin(-\eta) \\ \sin(-\eta) & \cos(-\eta) \end{bmatrix} \begin{bmatrix} e^{i\delta/2} & 0 \\ 0 & e^{-i\delta/2} \end{bmatrix} \begin{bmatrix} \cos\eta & -\sin\eta \\ \sin\eta & \cos\eta \end{bmatrix} \begin{bmatrix} \sin\chi \\ \cos\chi \end{bmatrix} \quad \text{Equation (7)}$$

$$= \begin{bmatrix} e^{i\delta/2}\cos\eta\{-\sin(\eta-\chi)\} + e^{-i\delta/2}\sin\eta\{\cos(\eta-\chi)\} \\ e^{i\delta/2}(-\sin\eta)\{-\sin(\eta-\chi)\} + e^{-i\delta/2}\cos\eta\{\cos(\eta-\chi)\} \end{bmatrix}$$

In the case where Fresnel's reflection coefficients corresponding to the p-polarized light and the s-polarized light are represented by $r_p$ and $r_s$ and Fresnel's transmission coefficients corresponding to the p-polarized light and the s-polarized light are represented by $t_p$ and $t_s$, respectively, the phase difference δ is defined as follows in the case where the compensating plate 60 allows the incident light to pass therethrough and the case where it reflects the incident light, respectively.

In case of transmission: $\delta = \angle(t_p) - \angle(t_s)$     equation (8)

In case of reflection: $\delta = \angle(r_p) - \angle(r_s) + \pi$

Real parts and imaginary parts of $E_x$ and $E_y$ will be summarized as follows.

$$\begin{bmatrix} E_x \\ E_y \end{bmatrix} = \begin{bmatrix} \cos(\delta/2)\sin\chi - i\sin(\delta/2)\sin(2\eta - \chi) \\ \cos(\delta/2)\cos\chi - i\sin(\delta/2)\cos(2\eta - \chi) \end{bmatrix} \quad \text{equation (9)}$$

Since a phase difference A is obtained by $$\Delta = \arg(E_x) - \arg(E_y) \quad (10)$$

it is calculated as follows.

$$\Delta = \mathrm{Tan}^{-1}\left[\frac{\sin\delta \cdot \sin(2\chi - 2\eta)}{\cos^2(\delta/2)\sin 2\chi + \sin^2(\delta/2)\sin(4\eta - 2\chi)}\right] \quad \text{equation (11)}$$

Figure 10:
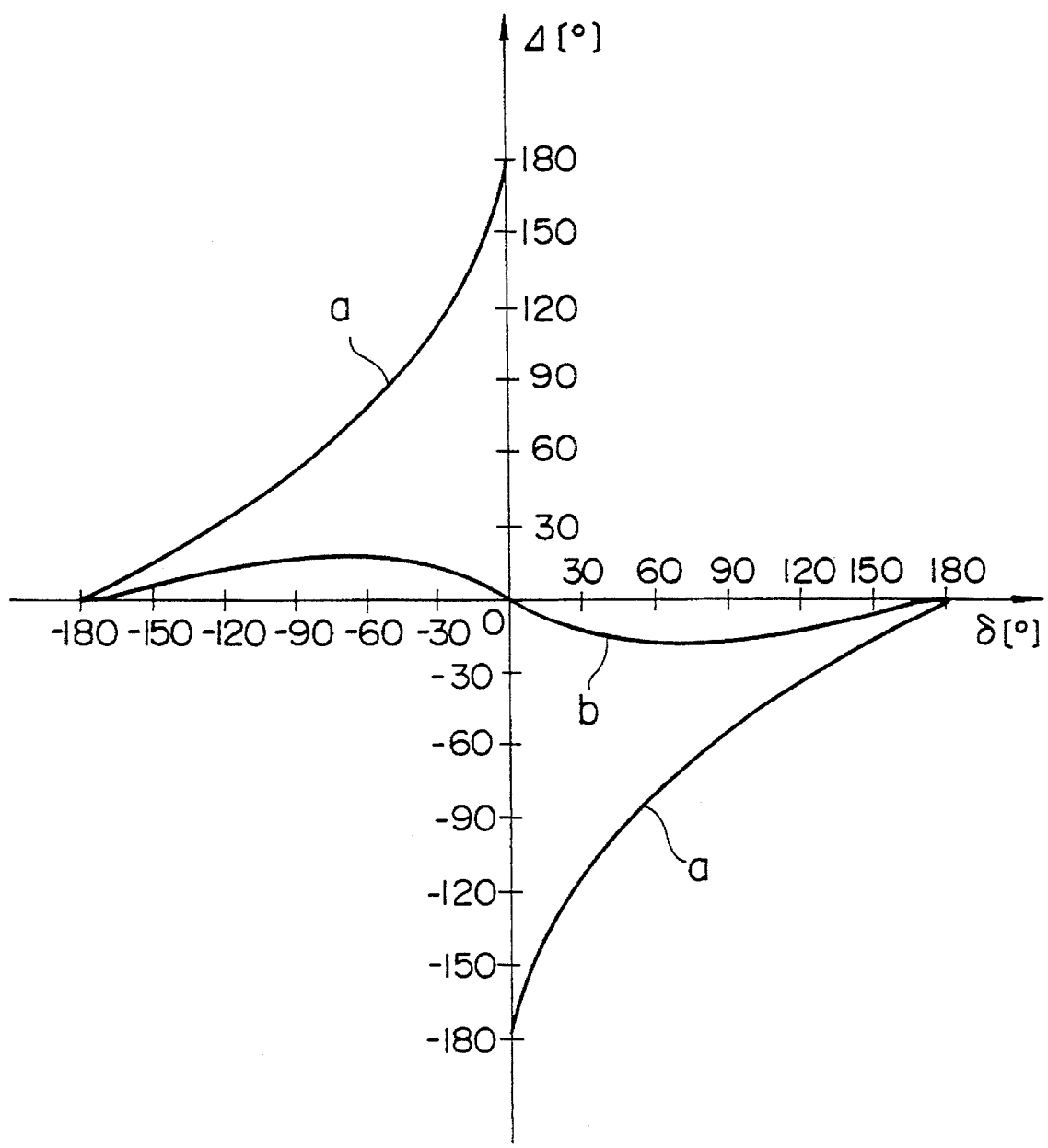
FIG. 10 is a characteristics diagram showing phases generated due to a difference in the direction of inclination of the polarizing state compensating plate having a phase difference provided in the image display apparatus shown in FIG. 7.

FIG. 10 shows the result of calculation by substituting the values for η and × in the equation (11).

In FIG. 10, an axis of abscissa δ [°] denotes a phase difference of the compensating plate 60 and an axis of ordinate Δ[°] indicates a phase difference which is obtained by the above equation (11). A curve (a) shows the result of the calculation in the case where the compensating plate 60 is arranged so as to be inclined in the opposite direction as shown in FIG. 8 for the surface of polarization operation 50*a*. A curve (b) shows the result of the calculation in the case where the compensating plate 60 is arranged in parallel to the surface of polarization operation 50*a*. Both of the light beam which is led from the polarizing prism 50 to the reflecting type liquid crystal panel 2X and the light beam which is led from the panel 2X to the prism 50 enter the compensating plate 60, so that the light beam after it has been transmitted twice by the compensating plate 60 finally enters the prism 50. In order to set the plane of polarization of the light beam which finally enters the polarizing prism 50 into the linear polarization as shown by the broken line arrow in FIG. 9D, therefore, it is sufficient to set the phase difference Δ which is obtained by the above equation (11) into ±90°. This is because a phase difference of 180° (=90° ×2) is given to the light beam after it has been transmitted twice by the compensating plate 60, so that the light beam can become the linear polarization light in which the plane of polarization is rotated. The operational angle is equal to η as mentioned above. It will be understood from FIG. 10 that the condition of ±90° is not satisfied so long as a characteristics curve is not the curve (a). A structure such that the compensating plate 60 is arranged so as to be inclined in the opposite direction as shown in FIG. 8 with respect to the surface of polarization operation 50*a* constitutes a condition (condition 1) necessary to compensate the rotational surface in the compensating plate 60.

Figure 11:
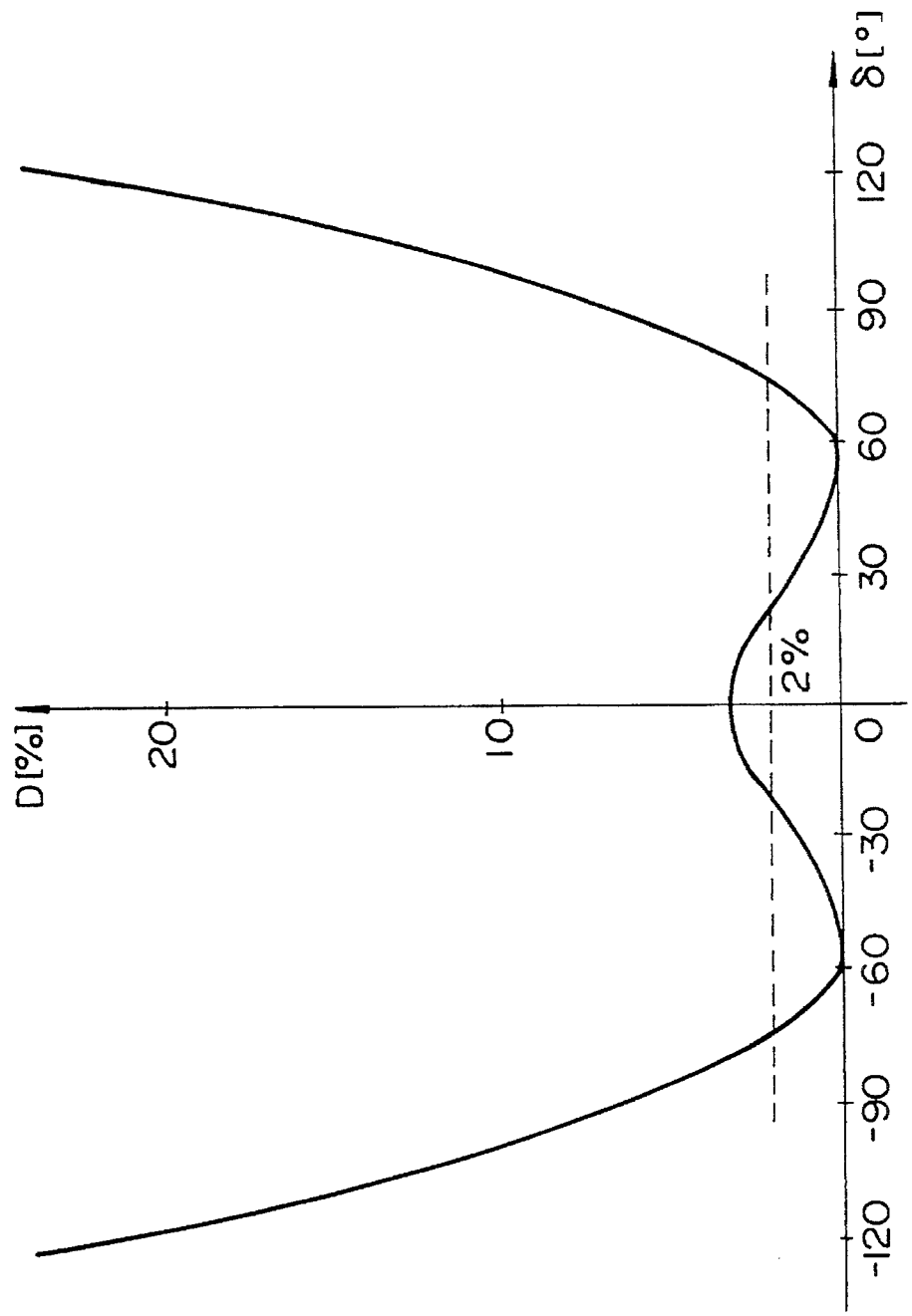
FIG. 11 is a characteristics diagram showing a correlation between the phase difference of the polarizing state compensating plate in the image display apparatus in FIG. 7 and the black level.

In the construction which satisfies the above condition, FIG. 11 shows a dark level for the phase difference δ of the compensating plate 60 in a light state of the liquid crystal panel 2X. In FIG. 11, an axis of abscissa δ [°] denotes a phase difference of the compensating plate 60 and an axis of ordinate D [%] indicates a dark level.

Now, assuming that it is conditioned that the black level D is equal to or less than 2% for a predetermined range where the apparatus can satisfy the so-called actual specifications, a range of the phase difference δ which satisfies such a condition is about 30°≦δ75° as will be understood from the characteristic diagram. Such a range may constitute a condition (condition 2) necessary to compensate the rotational surface in the compensating plate 60 in dependence on the specifications which are required for the apparatus.

FIGS. 12A through 12E show a polarizing state in each optical element in case of satisfying the above conditions.

FIG. 12A through 12E also show a polarizing state when the light having an angle for the optical axis entered in a manner similar to FIGS. 9A through 9E. In the diagram, the phase difference δ of the compensating plate 60 is equal to 60°.

Figure 12A:
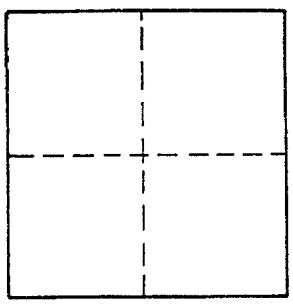
FIGS. 12A, 12B, 12C, 12D, and 12E are diagrams each showing a polarizing state in the case where the phase difference of the polarizing state compensating plate in the image display apparatus in FIG. 7 is equal to 60°.
Figure 12B:
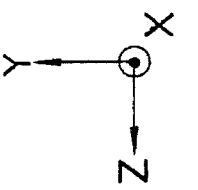
Figure 12B:
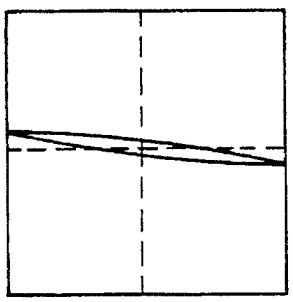
Figure 12C:
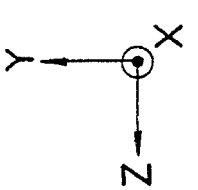
Figure 12C:
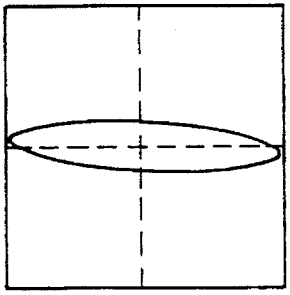
Figure 12D:
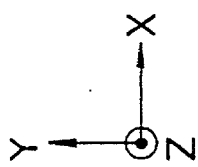
Figure 12D:
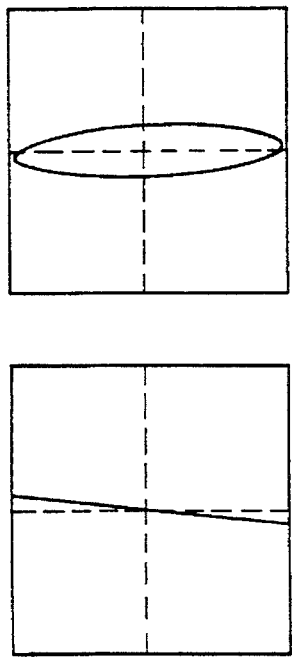
Figure 12E:

In FIGS. 12A through 12E, the light which is reflected by the prism 50 and enters the compensating plate 60 is in a state similar to those shown in FIGS. 6B and 9B. The rotation, therefore, of the plane of polarization in the clockwise direction occurs as shown in FIG. 12A. When such a light is transmitted from the compensating plate 60 of the phase difference δ=60°, it becomes elliptically polarized light as shown in FIG. 12B and enters the panel 2X. When the incident light is reflected as it is in a state in which no image is formed on the liquid crystal panel 2X, the direction of polarization is inverted as shown in FIG. 12C. When the light from the panel 2X is transmitted by the compensating plate 60, it approaches the linearly polarized light as shown in FIG. 12D and enters the polarizing prism 50. As shown in FIG. 12E, only the p-polarized component of the light from the panel 2X which entered the prism 50 is transmitted as a projection image.

When comparing FIGS. 12A through 12E with FIGS. 9A through 9E, it will be obviously understood that the level of the P polarization in FIG. 12E is smaller than the level of the P polarization in FIG. 9E. In the case, accordingly, where the rotation of the plane of polarization is not compensated as in the case of FIGS. 9A through 9E while setting the phase difference δ=0° in spite of the fact that no image is formed on the panel 2X, unnecessary image will be projected. In the case where the rotation of the plane of polarization is compensated by setting the phase difference δ=60° as shown in FIGS. 12A through 12E, it will be understood that only a small amount of unnecessary image is projected.

Figure 13:
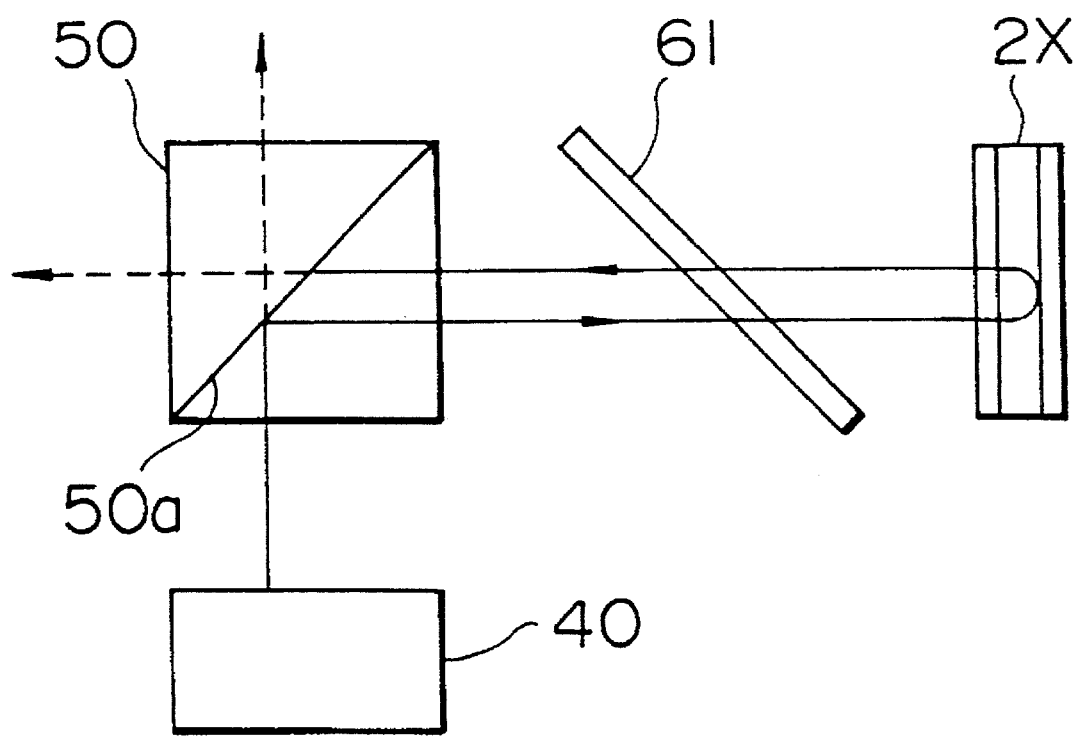
FIG. 13 is a diagram showing a construction of a main section in an image display apparatus according to another embodiment of the invention.

FIG. 13 shows a modification of the above embodiment and is a diagram showing the construction of a main portion of an image display apparatus of another embodiment according to the invention.

In the apparatus, a compensating plate 61 for compensating a plane of polarization transmits the light from the polarizing prism 50 and leads to the liquid crystal panel 2X. The compensating plate 60 functions so as to reflect the incident light and to compensate the rotation of the plane of polarization. The compensating plate 61, on the other hand, functions to allow the incident light to pass there through and to compensate the rotation of the plane of polarization. The apparatus of FIG. 13 has substantially the same operation and effects as those in the apparatus of the foregoing embodiment except the above point.

Figure 1:
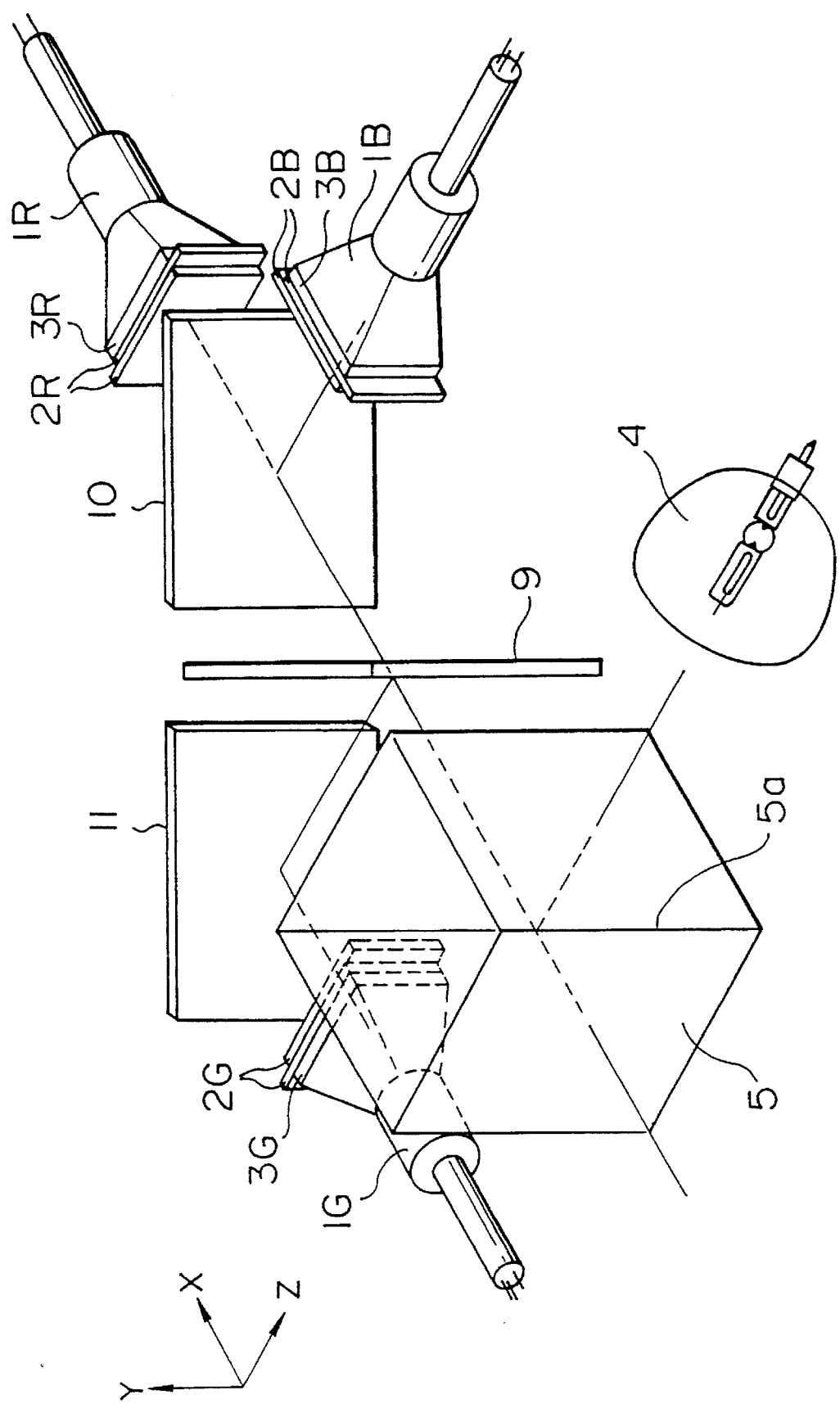
FIG. 1 is a diagram showing an arrangement relation among optical elements in a color image display apparatus constructed to use a reflecting type liquid crystal device.
Figure 2:
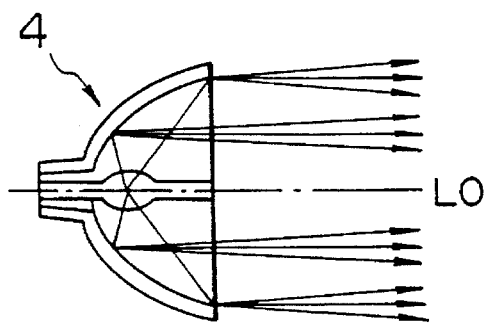
FIG. 2 is a diagram for explaining a problem experienced with a light source in the image display apparatus in FIG. 1.
Figure 3:
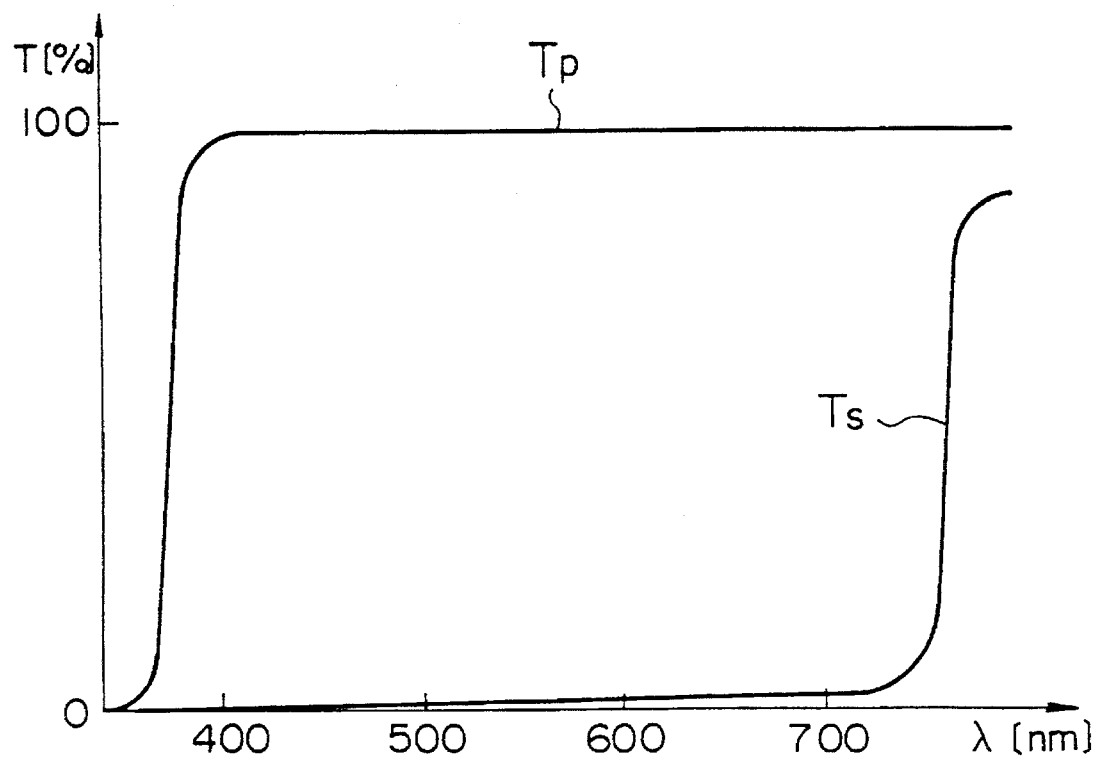
FIG. 3 is a characteristic graph showing polarizing characteristics of a polarizing prism in the image display apparatus in FIG. 1.
Figure 4:
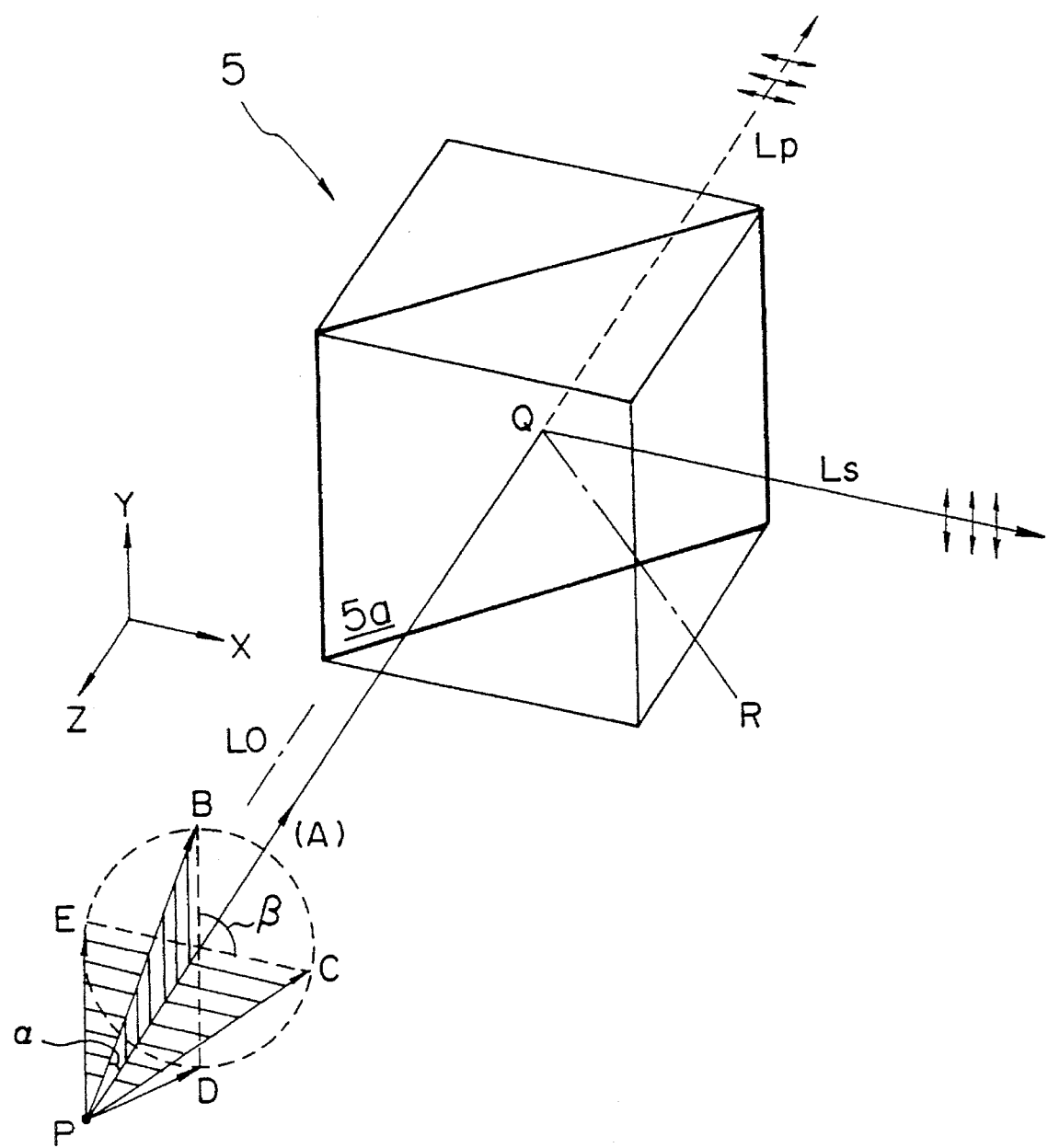
FIG. 4 is a diagram for explaining the operation of the polarizing prism in the image display apparatus in FIG. 1.

In the above embodiment, the polarization plane compensating plate has been arranged between the polarizing prism and the reflecting type liquid crystal panel. As a compensating plate to compensate the plane of polarization, the total reflecting mirror 11 or B reflecting dichroic mirror 10 as shown in FIG. 1 can be also commonly used. That is, by forming operational films similar to the polarization plane compensating plate to those mirrors, similar operation and effects can be also provided.

The above embodiment has shown the apparatus in which the polarization plane compensating plate is arranged between the polarizing prism and the liquid crystal panel with respect to one reflecting type liquid crystal panel. In a color image display apparatus, however, three reflecting type liquid crystal panels for three color channels of R, G, and B are generally used and at least two dichroic mirrors are needed to distribute the read-out light to those panels. In such a color image display apparatus, therefore, in order to allow each dichroic mirror to commonly function as a polarization plane compensating plate as mentioned above, it is necessary to satisfy the following conditions in accordance with the arrangement of each optical element.

That is, at least one dichroic mirror which satisfies the above condition (1) is necessary with respect to each color channel. This is because unless the plane of polarizations in all of the color channels are compensated, the improvement of the contrast becomes incomplete. In addition to the construction shown in FIG. 1 mentioned above, constructions in FIGS. 14 and 15 can be mentioned as a construction which satisfies the condition (1).

Figure 14:
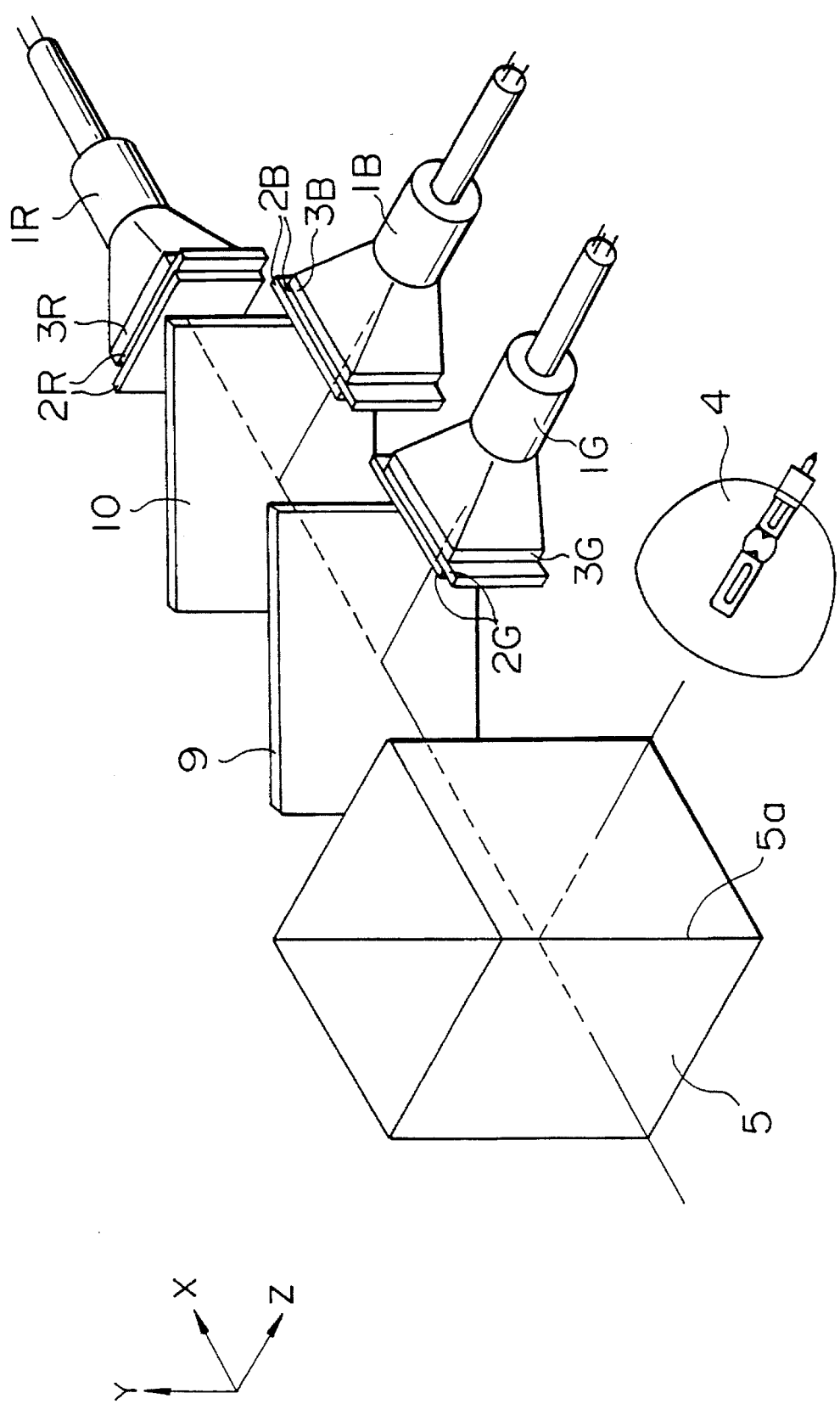
FIG. 14 is a diagram showing an arrangement relation among optical elements in a color image display apparatus according to still another embodiment of the invention.

FIG. 14 is a diagram in which the G reflecting dichroic mirror 9 having the function of compensating the plane of polarization (hereinafter, referred to as polarization plane compensating function) is arranged so as to be inclined in the opposite direction as shown in the diagram for the surface of polarization operation 5a and the B reflecting dichroic mirror 10 having the polarization plane compensating function is similarly arranged so as to be inclined with the opposite direction as shown in the diagram for the surface of polarization operation 5a.

In FIG. 14, it is now assumed that a phase difference $\delta$ of the dichroic mirror 9 is $\delta_1$, a phase difference of the dichroic mirror 10 is $\delta_2$, a rotational matrix $R(\eta)$ is:

$$R(\eta) = \begin{bmatrix} \cos\eta & -\sin\eta \\ \sin\eta & \cos\eta \end{bmatrix} \quad \text{equation (12)}$$

a phase difference $M_1$ by the dichroic mirror 9 is:

$$M_1 = \begin{bmatrix} e^{i\delta_1/2} & 0 \\ 0 & e^{-i\delta_1/2} \end{bmatrix} \quad \text{equation (13)}$$

a phase difference $M_2$ by the dichroic mirror 10 is:

$$M_2 = \begin{bmatrix} e^{i\delta_2/2} & 0 \\ 0 & e^{-i\delta_2/2} \end{bmatrix} \quad \text{equation (14)}$$

In this instance, since the rotating direction is equal, the polarizing state after the light passed through the dichroic mirror 10 is expressed as follows.

$$\begin{bmatrix} E_x \\ E_y \end{bmatrix} = R(-\eta) \cdot M_2 \cdot R(\eta) \cdot R(-\eta) \cdot M_1 \cdot R(\eta) \begin{bmatrix} \sin\chi \\ \cos\chi \end{bmatrix} \quad \text{equation (15)}$$

$$= R(-\eta) \cdot M_2 \cdot M_1 \cdot R(\eta) \begin{bmatrix} \sin\chi \\ \cos\chi \end{bmatrix}$$

$$= R(-\eta) \cdot M_{12} \cdot R(\eta) \begin{bmatrix} \sin\chi \\ \cos\chi \end{bmatrix}$$

wherein $$M_{12} = \begin{bmatrix} e^{i(\delta_1+\delta_2)/2} & 0 \\ 0 & e^{-i(\delta_1+\delta_2)/2} \end{bmatrix} \quad \text{equation (16)}$$

The equation (15) has a form similar to that of the above equation (7). The conditions in FIG. 14 corresponding to the above condition (2), therefore, are as follows.

$$30° \leq |\delta_1 + \delta_2| \leq 75° \quad (17)$$

Figure 16:
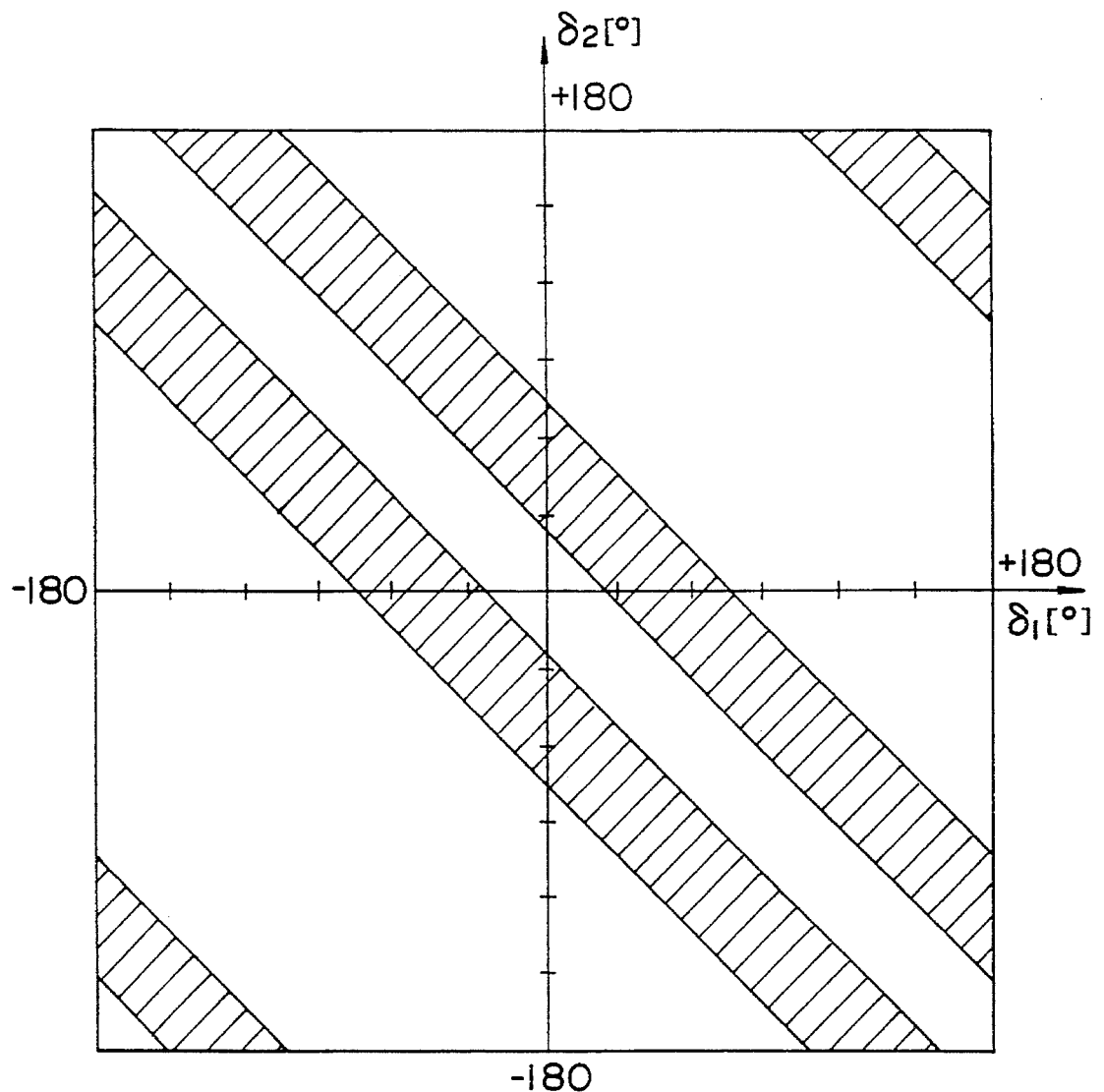
FIG. 16 is a diagram showing a correlation between the phase difference which is given to each dichroic mirror and the black level in the color image display apparatus shown in FIG. 14.
Figure 16:
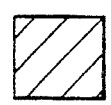

FIG. 16 is a diagram showing the correlation among the phase differences $\delta_1$ and $\delta_2$ given to the dichroic mirrors 9 and 10 in the construction of FIG. 14 and the black level in the light state. Hatched portions in the diagram show the black levels of 2% or less for the phase differences $\delta_1$ and $\delta_2$ of the axis or abscissa and the axis of ordinate, respectively.

Figure 15:
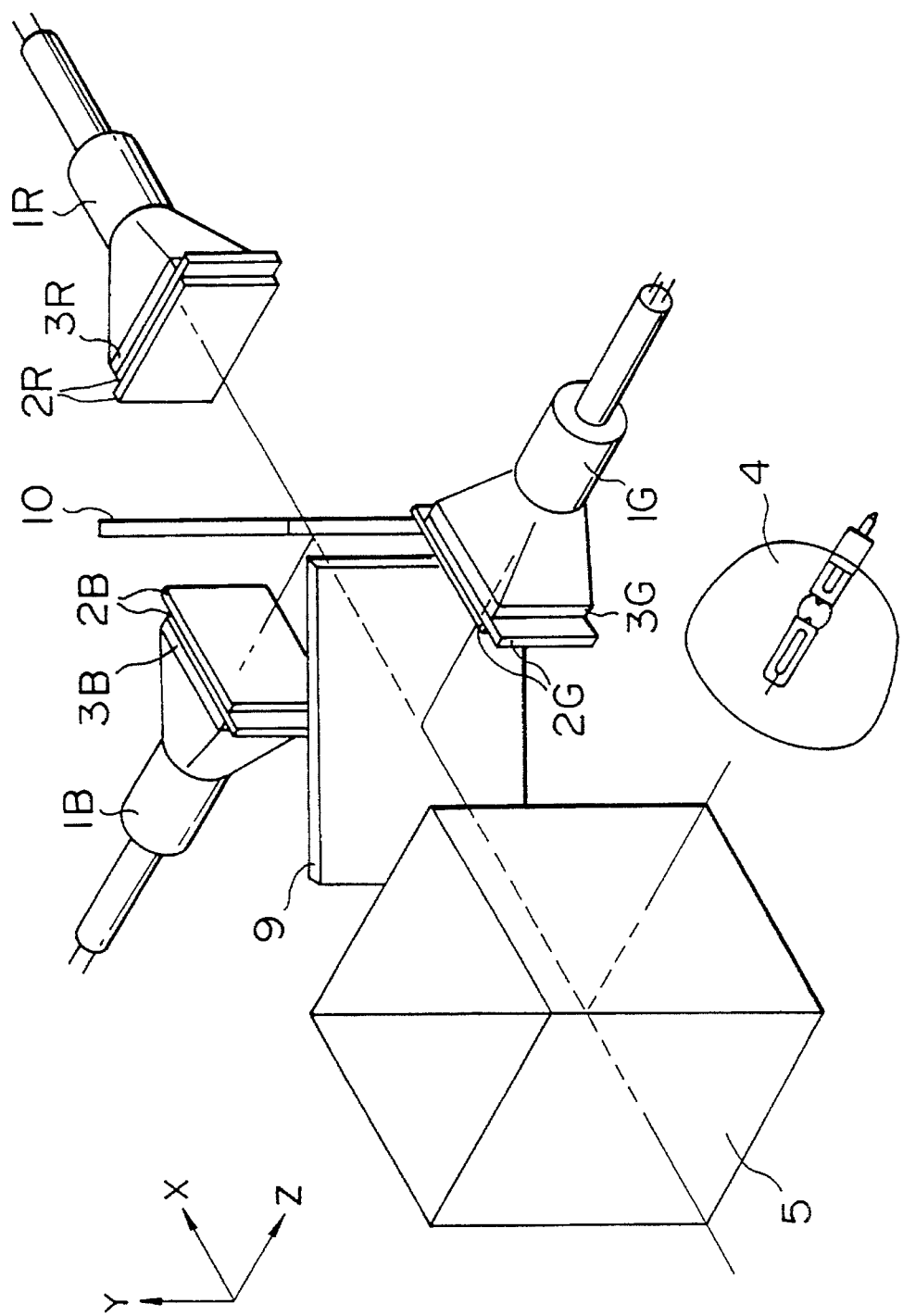
FIG. 15 is a diagram showing an arrangement relation among optical elements in a color image display apparatus according to a further embodiment of the invention.

FIG. 15 is a diagram showing a liquid crystal display apparatus in which the G reflecting dichroic mirror 9 having the polarization plane compensating function is arranged so as to be inclined in the opposite direction as shown in the diagram for the surface of polarization operation 5a and the B reflecting dichroic mirror 10 likewise having the polarization plane compensating function is arranged so as to be inclined in the direction that is parallel to the surface of polarization operation 5a.

With respect to the construction in FIG. 15, by executing calculations similar to those mentioned above, the following equation (18) is obtained.

$$\begin{bmatrix} E_x \\ E_y \end{bmatrix} = R(-\eta) \cdot M_2 \cdot R(\eta) \cdot R(\eta) \cdot M_1 \cdot R(-\eta) \begin{bmatrix} \sin\chi \\ \cos\chi \end{bmatrix} \quad \text{equation (18)}$$

Now assuming that the phase difference $\Delta$ is $$\Delta = \text{Tan}^{-1}(B/A) \quad (19)$$

the following equations are obtained.

$$\begin{aligned}
A = &\ (1/2)\cos^2(\delta_1/2) \cdot \cos^2(\delta_2/2) \cdot \sin 2\chi - \\
&\ (1/2)\sin^2(\delta_1/2) \cdot \sin^2(\delta_2/2) \cdot \sin(8\eta - 2\chi) + \\
&\ (1/2)\sin^2(\delta_1/2) \cdot \cos^2(\delta_2/2) \cdot \sin(4\eta - 2\chi) - \\
&\ (1/2)\cos^2(\delta_1/2) \cdot \sin^2(\delta_2/2) \cdot \sin(4\eta + 2\chi) + \\
&\ \cos(\delta_1/2) \cdot \cos(\delta_2/2) \cdot \sin(\delta_1/2) \cdot \\
&\ \sin(\delta_2/2) \cdot \{\sin(4\eta - 2\chi) - \sin 2\chi\} \\
B = &\ -(1/2)\sin\delta_1 \cdot \cos\delta_2 \cdot \sin(2\eta - 2\chi) + \\
&\ \sin^2(\delta_1/2) \cdot \sin(\delta_2/2) \cdot \cos(\delta_2/2) \cdot \sin(6\eta - 2\chi) + \\
&\ \cos^2(\delta_1/2) \cdot \sin(\delta_2/2) \cdot \cos(\delta_2/2) \cdot \sin(2\eta + 2\chi)
\end{aligned} \quad \text{equation (20)}$$

Conditions similar to those mentioned above are obtained as follows by calculating the numerical values on the basis of the above equations.

Figure 17:
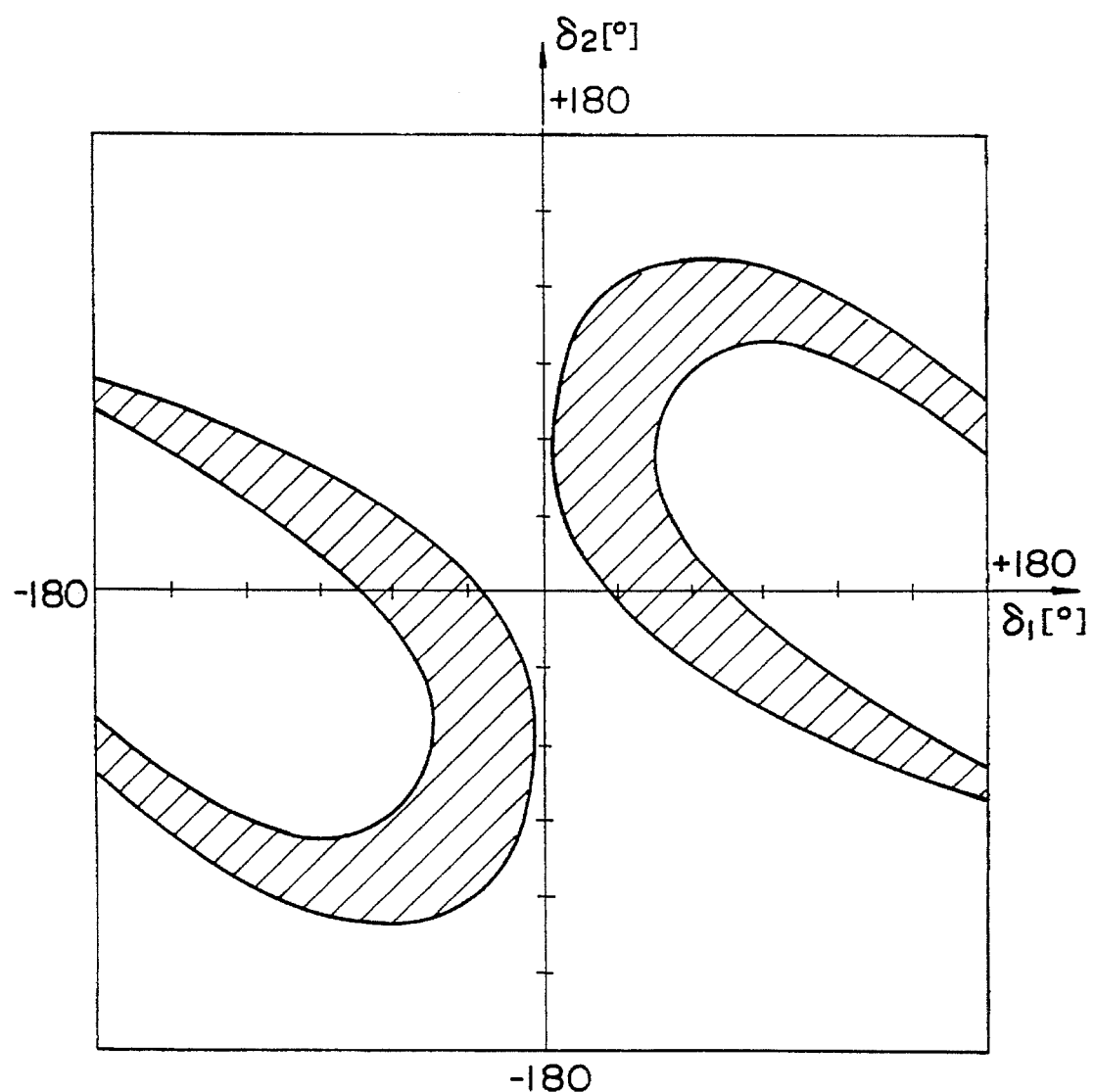
FIG. 17 is a diagram showing a correlation between the phase difference which is given to each dichroic mirror and the black level in the color image display apparatus shown in FIG. 15.

That is, FIG. 17 shows a diagram similar to FIG. 16 in the construction of FIG. 15. Contrasts for the phase differences $\delta_1$ and $\delta_2$ of the axis of abscissa and the axis of ordinate are indicated by distributions of a mark corresponding to the value of each contrast written at the right upper position in the diagram. As a range which satisfies that the black level is equal to or less than 2%, the following equation is derived.

$$180° \cdot N - 30° \leq |\delta_1 + \delta_2/2| \leq 180° \cdot N + 30° (N=0,1) \quad (21)$$

Figure 18:
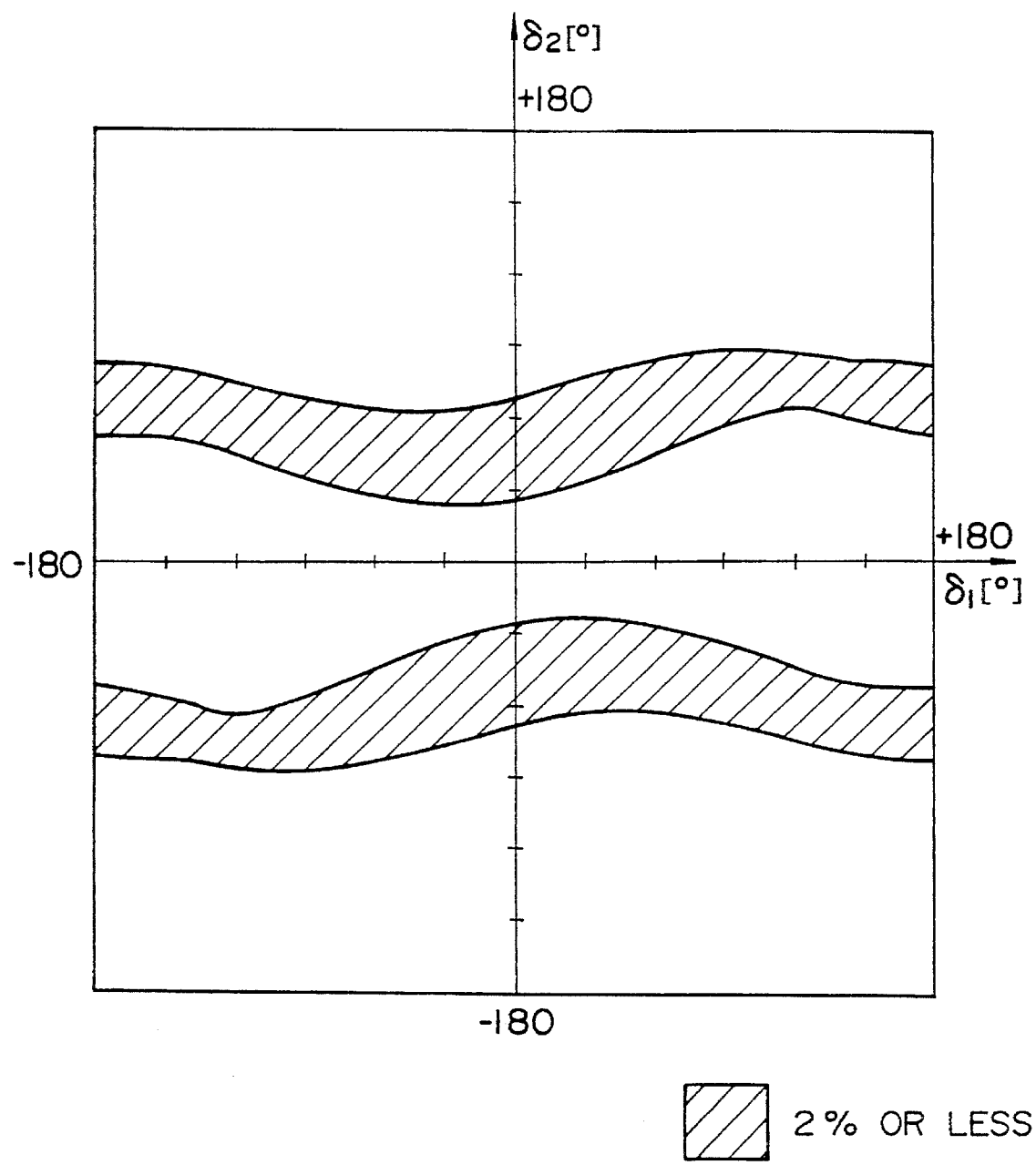
FIG. 18 is a diagram showing a correlation between the phase difference which is given to each dichroic mirror and the black level in the color image display apparatus shown in FIG. 1.

FIG. 18 shows the correlation among the phase differences of the dichroic mirrors 9 and 10 in the construction of FIG. 1 and the black level. It will be also understood from FIG. 18 that the dichroic mirror 9 is parallel to the surface of polarization operation 5a of the polarizing prism 5 and the phase difference $\Delta$ which is obtained by the above equations (19) and (20) practically does not depend on the phase difference $\delta_1$ of the dichroic mirror 9. The above conditions, therefore, also depend on only the phase difference $\delta_2$ of the dichroic mirror 10 and are as follows.

$$30° \leq |\delta_2| \leq 75° \quad (22)$$

In the construction of FIG. 1, therefore, the dichroic mirror 10 and the total reflecting mirror 11 need to satisfy the above condition (2) as already mentioned above.

Figure 19:
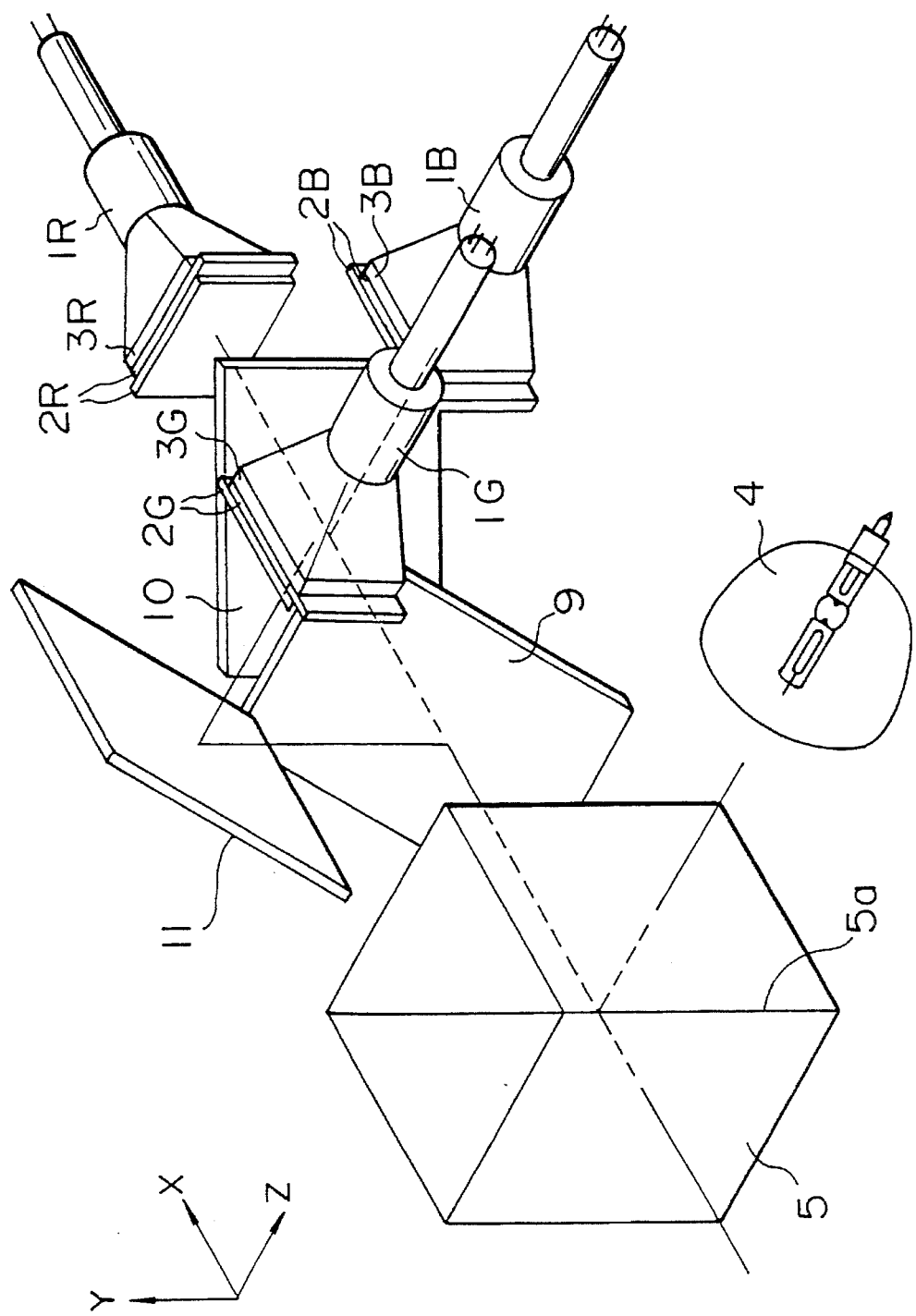
FIG. 19 is a diagram showing a modification of the color image display apparatus shown in FIG. 1.

The above embodiment has been described with respect to only the apparatus in which the rotational axis (Y axis) of the surface of polarization operation 5a of the polarizing prism 5 is the same direction as that of the rotational axis (Y axis) of the polarization plane compensating plate or the dichroic mirror and total reflecting mirror which have a function similar to that of such a compensating plate. The invention, however, is not limited to such an apparatus. For example, when considering FIG. 1 as an example, even when the dichroic mirror 9 and total reflecting mirror 11 are arranged as shown in FIG. 19 (in this case, the direction of the rotational axis Y of the surface of polarization operation 5a differs from the rotational axis X of the total reflecting mirror 11), the plane of incidence of the light beam which is led to the total reflecting mirror 11 as a polarization plane compensating plate is formed similarly to the plane of incidence in the dichroic mirror 10 as another polarization plane compensating plate. The apparatuses shown in FIGS. 1 and 19, consequently, provide similar effects.

As described above in detail, according to the reflecting type liquid crystal display apparatus of the invention, since the polarizing state compensating plate arranged on the optical path between the reflecting type liquid crystal device and the polarizing prism compensates the rotation of the plane of polarization of the incident light having an angle for the optical axis, the contrast can be improved while coping with that the plane of polarization is unnecessary rotated in the polarizing prism.

What is claimed is:

1. A reflecting type liquid crystal display apparatus comprising:

a reflecting type liquid crystal device for changing a polarizing state in accordance with an image, thereby reflecting an incident light;

a polarizing prism for receiving incident light from a light source and transmitting light of a predetermined polarized component from a surface of polarization operation to said reflecting type liquid crystal device, and for transmitting the light of a predetermined polarized component from said reflecting type liquid crystal device, thereby obtaining a projection image; and a polarizing state compensating plate which is arranged in an optical path between said reflecting type liquid crystal device and said polarizing prism, said polarizing state compensating plate having at least a surface in an oblique direction with respect to an optical path between said surface and said surface of polarization, which is different from an oblique direction of said surface of polarization operation with respect to said optical path, and a predetermined phase difference.

2. A reflecting type liquid crystal display apparatus comprising:

reflecting type liquid crystal devices of R (red), G (green), and B (blue) for changing polarizing states in accordance with images of R, G, and B, thereby reflecting an incident light;

first and second dichroic mirrors disposed in an optical path of light to and from said reflecting type liquid crystal devices;

a polarizing prism for receiving incident light from a light source and transmitting light of a predetermined polarized component from a surface of polarization operation to each of said reflecting type liquid crystal devices through said first and second dichroic mirrors, and for transmitting the light of a predetermined polarized component from said reflecting type liquid crystal devices which enter through said first and second dichroic mirrors, thereby obtaining a projection image; and polarizing state compensating plates each of which is arranged in an optical path between each of the reflecting type liquid crystal devices and said polarizing prism and has at least a surface in an oblique direction with respect to an optical path between said surface and said surface of polarization, which is different from an oblique direction of said surface of polarization operation with respect to said optical path and also has a predetermined phase difference.

3. A reflecting type liquid crystal display apparatus comprising:

reflecting type liquid crystal devices of R (red), G (green), and B (blue) for changing polarizing states in accordance with images of R, G, and B, thereby reflecting an incident light;

first and second dichroic mirrors arranged in each optical path between each of the reflecting type liquid crystal devices and said polarizing prism; and a polarizing prism for receiving incident light from a light source and transmitting light of a predetermined polarized component from a surface of polarization operation to each of said reflecting type liquid crystal devices through said first and second dichroic mirrors, and for transmitting the light of a predetermined polarized component from said reflecting type liquid crystal devices which enter through said first and second dichroic mirrors, thereby obtaining a projection image;

wherein each of said first and second dichroic mirrors has at least a surface in an oblique direction with respect to an optical path between said surface and said surface of polarization, which is different from an oblique direction of said surface of polarization operation with respect to said optical path and also has a predetermined phase difference, whereby performing a polarizing state compensating function.

4. An apparatus according to claim 3, wherein when said first dichroic mirror has the surface in the oblique direction different from the oblique direction of said surface of polarization operation and is arranged on a common optical path in each optical path between each of said reflecting type liquid crystal devices and said polarizing prism and said second dichroic mirror has the surface in the oblique direction different from the oblique direction of said surface of polarization operation, a phase difference $\delta_1$ of said first dichroic mirror and a phase difference $\delta_2$ of said second dichroic mirror satisfy the following relations:

$$30° \leq |\delta_1 + \delta_2| \leq 75°$$

5. An apparatus according to claim 3, wherein when said first dichroic mirror has the surface in the oblique direction different from the oblique direction of said surface of polarization operation and is arranged on a common optical path in each optical path between each of said reflecting type liquid crystal devices and said polarizing prism and said second dichroic mirror has the surface which is parallel to the oblique direction of said surface of polarization operation, a phase difference $\delta_1$ of said first dichroic mirror and a phase difference $\delta_2$ of said second dichroic mirror satisfy the following relations:

$$180° \cdot N - 30° \leq |\delta_1 + \delta_2/2| \leq 180° \cdot N + 30°$$

($N$=0,1)

6. An apparatus according to claim 3, wherein when said first dichroic mirror has the surface which is parallel to the oblique direction of said surface of polarization operation and is arranged on a common optical path in each optical path between each of said reflecting type liquid crystal devices and said polarizing prism and said second dichroic mirror has the surface in the oblique direction different from the oblique direction of said surface of polarization operation, a phase difference $\delta_2$ of said dichroic mirror satisfies the following relationship:

$$30° \leq |\delta_2| \leq 75°$$

7. An apparatus according to any one of claims 1 to 6, wherein said polarizing state compensating plate is formed by laminating dielectric thin films.

* * * * *